United States Patent [19]
Auerswald et al.

[11] Patent Number: 5,946,135
[45] Date of Patent: Aug. 31, 1999

[54] RETROREFLECTOR

[75] Inventors: Christoph Auerswald, Balgach; Stefan Koller, Appenzell; Barbara Laemmer, Rebstein, all of Switzerland; Markus Nesensohn, Sulz; Zoltan Szalmassy, Bregenz, both of Austria

[73] Assignee: Leica Geosystems AG, Heerbrugg, Switzerland

[21] Appl. No.: 08/945,418

[22] PCT Filed: Apr. 19, 1996

[86] PCT No.: PCT/EP96/01641

§ 371 Date: Feb. 11, 1998

§ 102(e) Date: Feb. 11, 1998

[87] PCT Pub. No.: WO96/33428

PCT Pub. Date: Oct. 24, 1996

[30] Foreign Application Priority Data

Apr. 20, 1995 [DE] Germany ............... 195 14 129
Apr. 19, 1996 [DE] Germany ............... 196 15 529

[51] Int. Cl.⁶ .......................................... G02B 5/122
[52] U.S. Cl. .................................. 359/529; 359/834
[58] Field of Search .............................. 359/529, 530, 359/831, 833, 834, 512

[56] References Cited

U.S. PATENT DOCUMENTS 3,836,275  9/1974  Finch ............................ 409/9

FOREIGN PATENT DOCUMENTS 42 26 266  1/1993  Germany.

Primary Examiner—James Phan
Attorney, Agent, or Firm—Foley & Lardner

[57] ABSTRACT

The invention relates to a retroreflector or a retroreflector arrangement in which the faces of the retroreflector are directly heated by a heating element. The retroreflector comprises a triple-mirror prism having three isosceles limiting faces and one equilateral limiting face. Also, the retroreflector has at least one heating element in direct contact with each of the faces. The heating elements directly heat the faces. As a result, the effectiveness of the retroreflector is not diminished in extreme weather conditions, for instance, in extremely cold or humid conditions.

27 Claims, 2 Drawing Sheets

RETROREFLECTOR

BACKGROUND OF THE INVENTION

1. Field of the Invention

The invention relates to a retroreflector or a retroreflector arrangement assembled from a plurality of retroreflectors and having structures for heating the faces of the retroreflector.

2. Description of Related Art

A retroreflector is an optical component comprised of a triple-mirror prism. A triple-mirror prism has three prism faces, which are at right angles to one another, that form a three-dimensional cube corner. Each of these prism faces constitutes a right-angled, isosceles triangle. The fourth limiting face of such a triple-mirror prism is an equilateral triangle. This face serves as the entrance and exit, simultaneously, for a light beam. Every beam entering the triple-mirror prism from outside is totally reflected at all three (isosceles) faces and exits the triple-mirror prism parallel to its direction of incidence and exits symmetrically to the central beam. When the triple-mirror prism is rotated about an arbitrary axis, the direction of the retroreflected beam is not changed.

Such retroreflectors are used in many fields of optics, for example, they are used frequently in optical surveying of open terrain. Difficulty arises, however, because, during operation of the retroreflector, weather conditions often have an adverse impact on the retroreflector's accuracy and performance.

The difficulties suggested in the preceding are not intended to be exhaustive, but are among many which tend to reduce the effectiveness of retroreflectors. Other noteworthy problems may exist; however, those presented above should be sufficient to demonstrate that such methods and apparatuses appearing in the past will admit to worthwhile improvement.

SUMMARY OF THE INVENTION

Accordingly, it is therefore a general object of the present invention to provide a retroreflector which will obviate or minimize difficulties of the type previously described.

It is a specific object of the invention to provide a retroreflector that remains fully functional under extreme weather conditions, particularly, in extremely cold weather.

A preferred embodiment of the invention that is intended to accomplish at least some of the foregoing objectives includes a retroreflector having a triple-mirror prism, which has three isosceles limiting faces and one equilateral limiting face; and at least one heating element in direct contact with the at least one heating element. Furthermore, each of the three isosceles limiting faces is heated equally and directly by the at least one heating element.

Additional objects and advantages of the invention will be set forth in the following description and, in part, will be clear from the description, or may be learned by practice of the invention. The objects and advantages of the invention may be realized and obtained by the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and, together with the general description of the preferred embodiment given below, serve to explain the principles of the invention.

FIG. 4b is a top view of the embodiment of FIG. 4a; and

DETAILED DESCRIPTION OF THE PREFERRED EMBODIMENTS

Figure 1A:
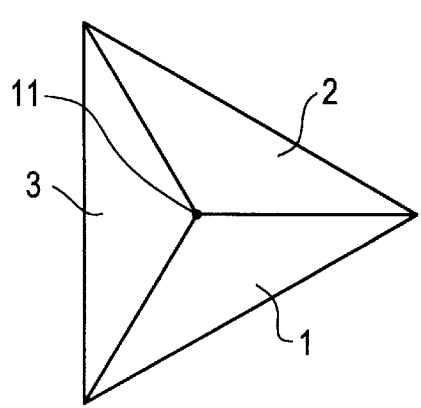
FIG. 1a is a rear view of a retroreflector.
Figure 1B:
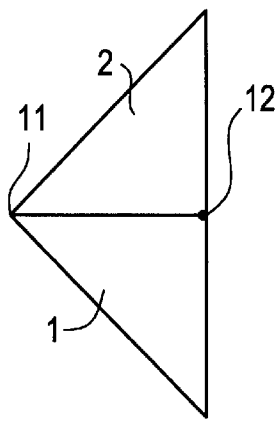
FIG. 1b is a side view of a retroreflector.
Figure 1C:
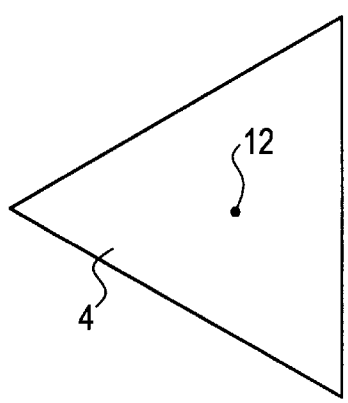
FIG. 1c is a front view of a retroreflector.

The invention is explained in more detail with the aid of the drawings, in which, in purely diagrammatic representations, various views of a triple-mirror prism are represented in FIGS. 1a to 1c. As seen in FIG. 1a, the retroreflector has three isosceles limiting faces 1, 2 and 3, which have a common point of intersection constituting a cube corner 11. A top view of the entrance and exit face 4 of the triple-mirror prism is shown in FIG. 1c. The entrance/exit face 4 is an equilateral triangle.

A perpendicular bisector (not shown) of the face 4 extends through the cube corner 11. To a certain extent, the perpendicular bisector represents a trigonal axis of symmetry. The perpendicular bisector also serves simultaneously as the body diagonal through an imaginary cube, one "body" corner 11 of which is represented in FIG. 1a.

Figure 2:
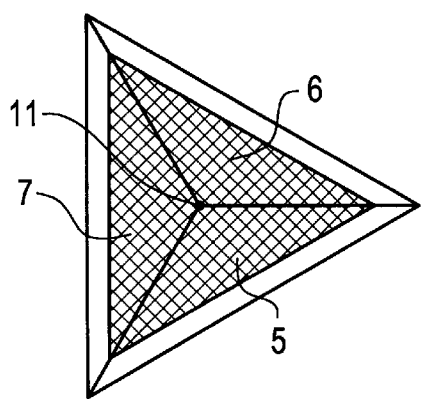
FIG. 2 is a first embodiment, according to the invention, of a retroreflector.

The three congruent limiting faces 1, 2 and 3 are covered, over a large part of the respective face areas, with two-dimensional heating elements 5 to 7, respectively. The two-dimensional heating elements 5 to 7 are applied directly to these limiting faces 1 to 3 with adhesive, which is suitable for conducting thermal energy. Because of the purely diagrammatic representation, no attempt has been made to represent the wiring paths which constitute the connection between these heating elements 5 to 7 and an external energy source. In the preferred embodiment of FIG. 2, it is apparent that one wiring path will suffice, because since all three heating elements 5, 6 and 7 are interconnected in an electrically conductive fashion.

Figure 3:
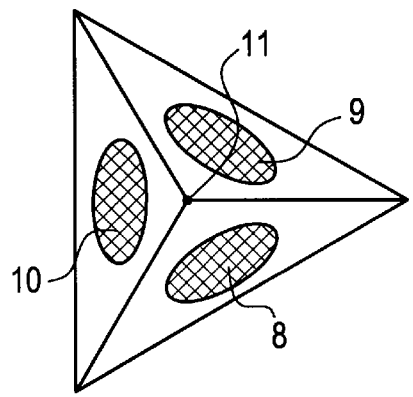
FIG. 3 is a second embodiment, according to the invention, of the retroreflector.

The faces of the retroreflector can also be equipped with heating elements that are of different shapes such that the shapes are not interconnecting. Such an embodiment is shown in FIG. 3, in which each face has a circular heating element 8 to 10. Other curved shapes may also be utilized on the surfaces of the respective faces of the retroreflector.

The trigonal axis of symmetry of the retroreflector stands on the plane of the drawing in the case of FIG. 3 and penetrates the point 11. If the circular surface 8 is rotated by 120°, it is congruent with the surface 10, and the latter is congruent in turn with the surface 9 after a further rotation by 120°.

A triple mirror must be processed with high precision. Accordingly, it is advantageous if the heating elements are applied so as to be of the same size and area and at the same position (with respect to the trigonal axis of symmetry) to avoid different, locally induced thermal expansions which could lead to the entire system being impaired. It is advantageous to construct the heating elements as two-dimensional heating foils which are applied directly to the limiting faces 1 to 3. Of course, it is also possible for the limiting faces 1 to 3 firstly to have a layer or a layer system which serves to increase the reflection of the incident electromagnetic radiation.

Figure 4A:
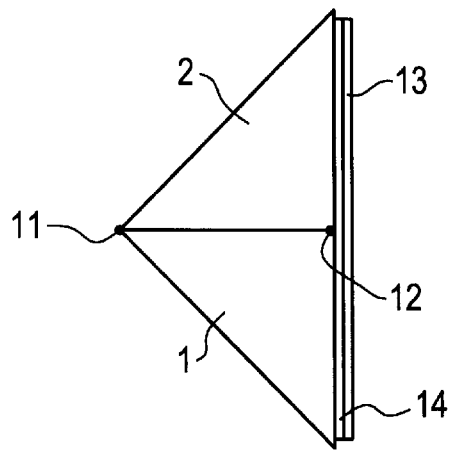
FIG. 4a is a side view in accordance with FIG. 1b, with a transparent substrate and an additional transparent, heatable layer.
Figure 4B:
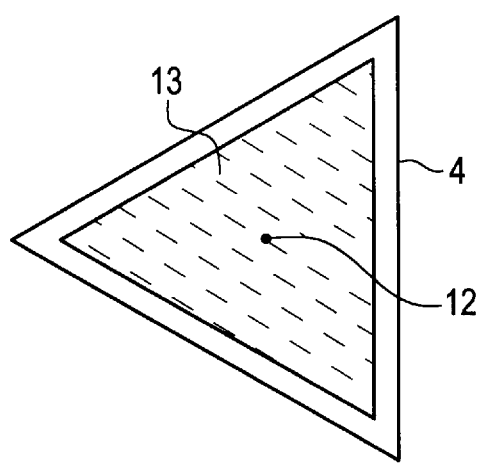
Figure 5:
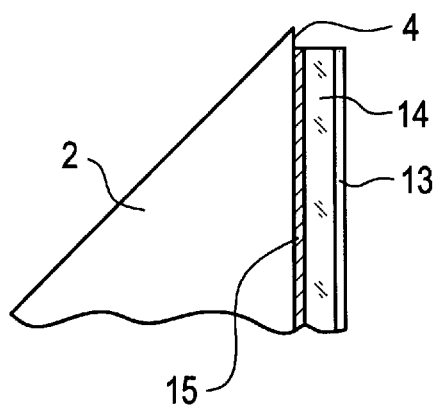
FIG. 5 is a detailed portion of the embodiments represented in FIGS. 4a, 4b, with an additional adhesive/cement layer between the transparent substrate and the limiting face.

Another preferred embodiment is shown in FIGS. 4a and 4b. The equilateral limiting face 4 has a transparent substrate 14 in the form of a plate or a disk, which serves to reduce the reflection of the incident electromagnetic radiation. Also located on the transparent substrate 14 is an electrically heatable transparent layer 13. The heating elements 5 to 10 and the transparent layer 13 can be applied directly to the limiting faces 1 to 4 via known deposition methods, e.g., vacuum evaporation, sputtering or the like. The substrate 14 may also be fastened to the entrance face 4 via known joining techniques.

According to yet a further embodiment of the present invention, the heating element is fastened—preferably in a displaceable manner—in front of the entrance face 4 via known mechanical holding devices. In such an arrangement, it is also possible that the layer 13 or the substrate 14 does not cover the entire entrance face 4. It is, however, advantageous always to ensure that the electrically heatable face (s) is(are) arranged symmetrically in relation to the respective center point of each face of the triple prism—which would be point 12 on face 4. Consequently, as may be seen from FIG. 4b, the transparent layer 13 has likewise been constructed as an equilateral triangle.

The heating foils are in contact with wiring paths (not represented) which produce an electric connection to an energy source.

Normally, the retroreflector consists of optical glass; however, it is also possible for the retroreflector to be constructed of ceramic glass or silica glass. In addition, the substrate 14, which is constructed as a plane-parallel plate or disk, may be constructed of glass, ceramic glass, silica glass or some form of organic material. It is particularly advantageous if the retroreflector is installed in a housing, which also accommodates the electronic system used to control the heating output.

It is within the scope of the present invention to combine retroreflectors of the same type to form a group in an array or matrix arrangement.

The advantages of the present invention as compared with the known devices reside, in particular, in that they are easy to produce and not susceptible to faulty operation, even in extreme operating situations. In addition, it is very easy to install the retroreflectors according to the invention in existing systems. The retroreflector according to the invention is particularly advantageous, because the direct heating employed in the invention can prevent completely water from freezing on the faces of the retroreflector. Operational and functional reliability are thereby ensured without limitation, particularly in outdoor operation where extreme temperature and moisture fluctuations may be encountered.

Additional advantages and modifications will readily occur to those skilled in the art. Therefore, the invention in its broadest aspects is not limited to the specific details, and representative devices, shown and described herein. Accordingly, various modifications may be made without departing from the spirit or scope of the general inventive concept as defined by the appended claims and their equivalents.

We claim:

1. A retroreflector comprising:
    a triple-mirror prism having three isosceles limiting face; and one equilateral limiting face; and
    at least one heating element in direct contact with each of the three isosceles limiting faces;
    wherein each of the three isosceles limiting faces is heated directly by a respective at least one heating element.

2. A retroreflector according to claim 1, wherein the at least one heating element comprises three heating elements and at least one of the three heating elements is applied to each of the isosceles limiting faces.

3. A retroreflector according to claim 2, wherein each of the three heating elements includes a heating foil.

4. A retroreflector according to claim 3, wherein each of the heating foils is adhesively bonded to the respective isosceles limiting face and wherein an adhesive conducts thermal energy.

5. A retroreflector according to claim 2, wherein the three heating elements are congruent and are positioned symmetrically on the isosceles limiting faces with respect to a trigonal axis of the retroreflector.

6. A retroreflector according to claim 1, wherein each of the at least one heating element is arranged in a form of a strip.

7. A retroreflector according to claim 2, further comprising at least one additional layer mounted to each of the isosceles limiting faces between the limiting face and the respective heating element, wherein the layer increases the reflection of the incident electromagnetic radiation.

8. A retroreflector according to claim 1, further comprising at least one layer of a material mounted to the equilateral limiting face, wherein the material reduces the reflection of the incident electromagnetic radiation.

9. A retroreflector according to claim 1, further comprising a transparent heating element applied to the equilateral limiting face, wherein the heating element is transparent to an incident radiation which enters through the equilateral limiting face.

10. A retroreflector according to claim 9, wherein the transparent heating element is an electrically heatable transparent layer.

11. A retroreflector according to claim 1, further comprising a substrate mounted to the equilateral limiting face; and a transparent heating element mounted to the substrate, wherein the transparent heating element is electrically heatable.

12. A retroreflector according to claim 1, further comprising a transparent mechanically fastened immediately in front of the equilateral limiting face.

13. A retroreflector according to claim 11, wherein the transparent heating element or the substrate does not cover the entire equilateral limiting face.

14. A retroreflector according to claim 13, wherein the transparent heating element an equilateral triangle having a central axis of the three-mirror prism as its center.

15. A retroreflector according to claim 2, further comprising a wiring path in contact with the heating elements, wherein the wiring path is in contact with an energy source.

16. A retroreflector according to claim 1, wherein the triple-mirror prism comprises glass.

17. A retroreflector according to claim 1, wherein the retroreflector is adapted to be installed in a housing.

18. A retroreflector according to claim 17, wherein the housing includes an electronic system used to control a heating output.

19. A retroreflector according to claim 1, wherein the retroreflector is combined with at least one other retroreflector to form a group in an array or matrix arrangement.

20. A retroreflector according to claim 11, wherein the substrate is constructed as a plane-parallel plate and comprises glass.

21. A heatable retroreflector which is constructed as a solid body in the form of a triple-mirror prism, comprising:
three isosceles prism faces and one equilateral prism face; and
a heat source having at least one electric heating element in direct contact with each isosceles prism face;
wherein the faces are heated directly and identically by the at least one electric heating element and wherein the retroreflector is embodied in a monolithic design.

22. A retroreflector according to claim 1, wherein each of the at least one heating element is arranged in a form of a grating.

23. A retroreflector according to claim 9, wherein the transparent heating element is deposited on the equilateral limiting face.

24. A retroreflector according to claim 1, wherein the triple-mirror prism comprises silica glass.

25. A retroreflector according to claim 1, wherein the triple-mirror prism comprises ceramic glass.

26. A retroreflector according to claim 11, wherein the substrate is constructed as a plane-parallel plate and comprises silica glass.

27. A retroreflector according to claim 11, wherein the substrate is constructed as a plane-parallel plate and comprises ceramic glass.

* * * * *